Figure 1:
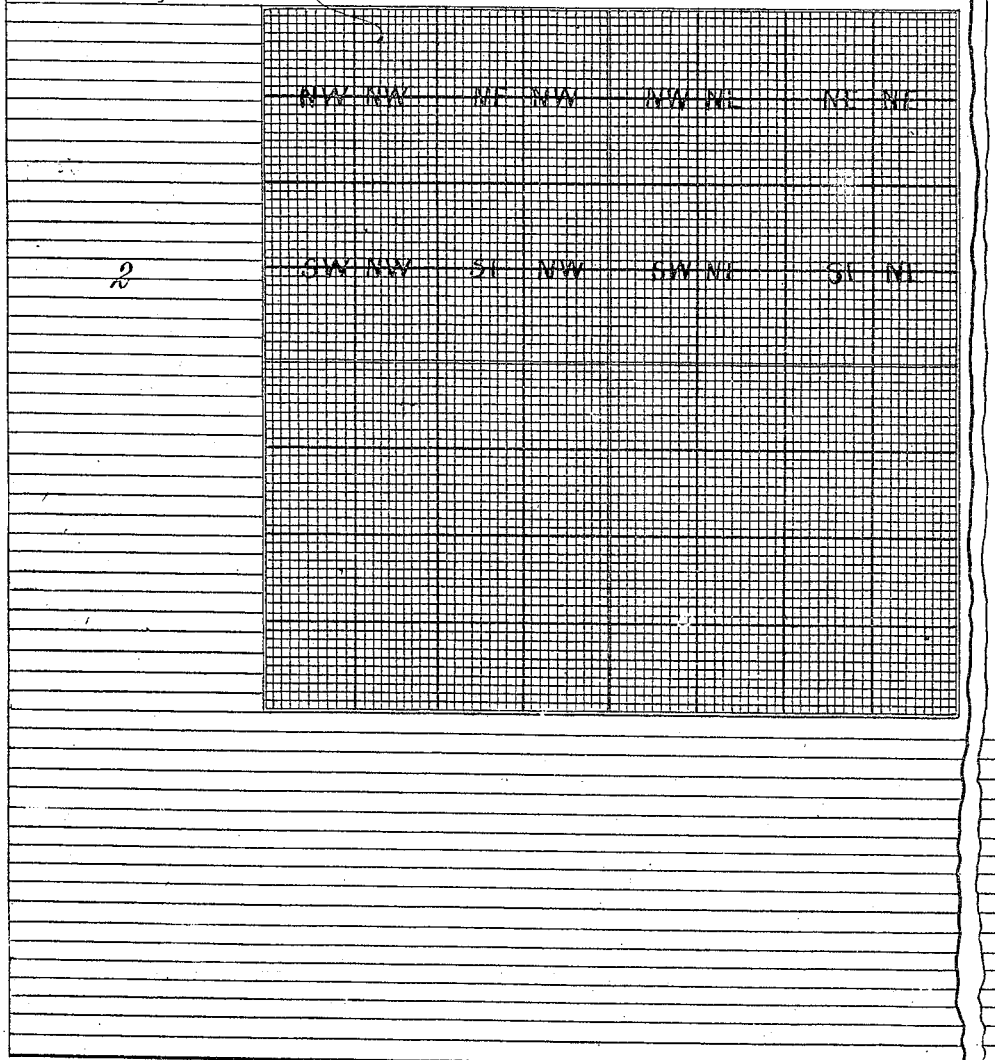

A. W. ESTES.
INDEX FOR ABSTRACTS OF CONVEYANCES AND OTHER RECORDS AFFECTING LAND TITLES
APPLICATION FILED OCT. 19, 1909.

1,011,765.

Patented Dec. 12, 1911.

2 SHEETS—SHEET 1.

A. W. ESTES.
INDEX FOR ABSTRACTS OF CONVEYANCES AND OTHER RECORDS AFFECTING LAND TITLES.
APPLICATION FILED OCT. 19, 1909.

1,011,765.

Patented Dec. 12, 1911.

2 SHEETS—SHEET 2.

Witnesses.

Inventor:
Ambrose W. Estes.
By James L. Norris
Atty.

UNITED STATES PATENT OFFICE.

AMBROSE W. ESTES, OF YELLVILLE, ARKANSAS.

INDEX FOR ABSTRACTS OF CONVEYANCES AND OTHER RECORDS AFFECTING LAND-TITLES.

1,011,765.   Specification of Letters Patent.   Patented Dec. 12, 1911.

Application filed October 19, 1909. Serial No. 523,479.

*To all whom it may concern:*

Be it known that I, AMBROSE W. ESTES, a citizen of the United States, residing at Yellville, in the county of Marion and State of Arkansas, have invented new and useful Improvements in Indexes for Abstracts of Conveyances and other Records Affecting Land-Titles, of which the following is a specification.

My present invention relates to improvements in indexes of the type adapted for use in keeping records of conveyances and other instruments which affect title to land and other property, and it has for its object to provide an index of this character which is capable of containing a concise but complete reference to all of the various records in the recorder's office as well as court or other records whereby all transactions affecting the title of lands may be immediately located, and while the index is full and complete, it at the same time is simple and of such a nature that it may be provided at small cost of time and money and, moreover, the making of abstracts can be accomplished more completely and rapidly and furthermore in a more reliable way than can be accomplished in any of the known methods heretofore employed.

In the accompanying drawings I have shown certain forms which I prefer to employ in carrying out the invention.

In the said drawings: Figure 1 represents a tract or plat index. Fig. 2 represents a form which is adapted to have indexed thereon all transfers or transactions affecting property located in such tract, and Fig. 3 illustrates a portion of a page which embodies a grantee's index.

The systems heretofore used for indexing instruments affecting land titles have been of a more or less elaborate character, containing a brief abstract of all conveyances and records affecting title to property in the county for which they are compiled. The cost and labor in preparing and maintaining such records has, however, been very great and it has, therefore, required considerable capital to initiate a system of such character. According to the present invention, however, the cost and labor involved in initiating and maintaining a record of all transactions or instruments affecting land titles is reduced, reliability is insured and the work involved in examining land titles is materially facilitated.

According to the present invention, a book in the form of one or more volumes combined preferably by a loose leaf binder is employed, certain pages of the book containing plats of the various sections of a township, each plat being immediately preceded by an index which corresponds to and is of a form to receive entries of all instruments affecting land situated in that particular section. By using the loose leaf binder, pages may be added as necessary to accommodate entries as they increase in numbers, it being possible to add one or more indexes in a position so as to immediately precede the particular plat wherein the instruments referred to in such index affect land titles in the corresponding section. The several pages for the plats may be substantially duplicates, each having preferably a heading which contains, in blank, reference to the section, township and range, blank spaces being left so that the numbers of the section, township and range may be readily entered. Each page contains a diagram 1 which partially covers the page so as to leave a space 2 for the entry of data relating to transfers of title to lands located in that particular section but which cannot be designated by the usual descriptive characters, the page being preferably ruled and being headed "Irregular descriptions." The diagram is preferably ruled in the usual manner by horizontal and vertical lines which form squares of regular sizes and each plat preferably represents a subdivisional forty-acre tract.

Fig. 2 shows what I may term a subdivisional index, each of these indexes being in the form of a page which immediately precedes the corresponding plat, the index as shown in Fig. 2 being provided with a heading adapted to receive the numbers of the section, township and range. This sectional index is ruled horizontally so that the data pertaining to the entries for each instrument or transaction are made in a horizontal row. This sectional index is also ruled vertically to form three adjacent columns 3, 4 and 5, which receive entries respectively of the number of the book and the page thereof containing the instrument, and the character of the instrument affecting a particular transaction. This sectional index is also ruled vertically to form columns 6 and 7 to receive the names respectively, of the grantor and the grantee. Immediately to the right of the column 7 for the grantees' names, the page is ruled vertically to form four main columns 8 which are preferably designated NE, NW, SW and SE, corresponding to the northeast, northwest, southwest and southeast subdivisions of the section. Each of these main divisions 8 is further divided into four columns making sixteen spaces corresponding to the subdivisions of the main division, and a horizontal row of numerals 9 running from 1 to 16 inclusive is preferably provided, one for each subdivisional space whereby the entry of an appropriate character designating in which particular subdivision land affected by a particular instrument is located, may be facilitated. Immediately to the right of the columns to receive characters designating in what portion of the section the land affected is located, I provide a column 10 headed "Acres," in which column entries may be made showing the number of acres contained in the property affected by the instrument. The main divisions 8 and their subdivisions refer by the usual or well known characters to the common descriptions which may be readily located upon the plat. It sometimes happens, however, that property cannot be described, owing to its peculiar location, by the common or usual characters or designations, and for this reason I provide a supplemental column 11 headed "Irregular descriptions," this column being adapted to receive an entry of an arbitrary character which will be entered upon the ruling of the plat page, Fig. 1, under the heading "Irregular descriptions." A column 12 is provided to the right of the column 11 and is subdivided and appropriately headed to receive entries of the month, day and year corresponding to the date of the instrument. A column 13 may be provided at the right of the column 12 and headed "Remarks," this column being adapted to receive any additional data which it may be found desirable to enter respecting the instrument.

Fig. 3 represents a page from a grantee's index and it may be either bound in the same book with the plat pages and the sectional indexes or it may be contained in a separate book. Each grantee's index page is ruled horizontally so that entries pertaining to instruments affecting the title of one grantee, may be continued in the same horizontal line. Each grantee's index page is also ruled vertically to provide a column 14 in which are adapted to be entered the names of the grantees named in the instruments, and at the left of the column 14 a column 15 is provided bearing numerals whereby entries from one page may be continued with facility upon the reverse side of the sheet or upon the following page which, of course, has its horizontal rows correspondingly numbered. At the right of the column 14, the page is ruled vertically to form spaces 16, which spaces are preferably printed in blank, as shown, to receive entries describing the character of the instrument, the book and page thereof containing the instrument, and immediately beneath the blank printing just described, spaces are preferably left to receive description by appropriate characters of the location of the property on the plat affected by the instrument. The date which the instrument bears may also be entered in each space.

An abstractor in making an abstract by the aid of an index embodying the present invention, turns the pages of the book to the section in which such property to be abstracted is located, and notes the books and pages and other information which he finds indorsed upon the sectional index page of Fig. 2 and the plat of Fig. 1. The abstractor thereby obtains such data as will enable him to locate the original record which contains the instrument. In order to determine what property is owned by a particular individual, the grantee's index, Fig. 3, is used, all instruments whereby such individual obtains title to property being entered to the right of such individual's name. It is obvious that a further subdivision of the sections may be made to facilitate entry and reference to instruments affecting town lots, in which case a plat similar to Fig. 1 and a town lot index similar to Fig. 2, would be used.

By using a plat of the kind above described in combination with an index to contain entries of all instruments affecting property located in said plat, said index containing columns to receive characters which designate the location of the property upon the plat, it is obvious that when an instrument is found affecting certain property contained in the plat, such property can be immediately located by noting the location heading contained at the top of such column and conversely, after property has been located upon the plat, it may be quickly determined whether there are any instruments affecting title to said property by mere reference to the corresponding location-defining column of the index.

It will be understood that when an instrument is recorded covering an irregularly defined area, such area on the plat may have applied thereto an appropriate character, the significance of which may be made plain by an appropriate entry upon the plat sheet under the heading "Irregular descriptions."

The squares upon the plat represent an appropriate subdivision of a township section, these squares bearing a predetermined relation to the headings and designating numerals in the columns upon the grantor's index, as shown in Fig. 2. A transfer affecting land located in any part of the section represented by this plat may be instantly located by following down the appropriate column in the grantor's index to determine whether an entry is made in such column, and by reference to the plat, the relative location of the land affected by such a transfer can be instantly determined. This plat index is adapted to have outlined within the appropriate square land of an irregularly defined area, and if such irregularly defined area cannot be definitely designated by one of the headings of the grantor's index, then a special character may be applied to the irregularly defined area on the plat, and an appropriate entry may be made in the space provided upon the balance of the sheet containing the plat and under the heading "Irregular descriptions". It will therefore be seen that the plat and the grantor's index correspond with one another but one indicates the relative location of such lands as may be affected by the different transfers, while the grantor's index contains the name of the grantor, the grantee, the location of the land affected by the transfer, and other data relating to such transfer and abstracts may be prepared with the greatest facility and accuracy by consulting both the plat and the index. The grantee's index is to be used in conjunction with the grantor's index, the grantee's index enabling an abstractor to quickly determine all property owned by a given individual in a certain section.

I claim as my invention:

1. A device for facilitating the entry and examination of instruments affecting land titles embodying a plat containing a diagram of a tract of land, the diagram being divided into main areas and subdivisions thereof having identifying characters, in combination with a plat index having vertical lines which divide it into main columns which equal in number the number of main areas of the plat, said main columns being subdivided by intersecting horizontal and vertical lines forming subdivisional columns appropriately designated to receive entries of data pertaining to instruments affecting land situated in said diagram, the subdivisional vertical columns of the plat index having a heading bearing characters individual to the respective subdivisional vertical columns and like said identifying characters on the diagram.

2. A device for facilitating the entry and examination of instruments affecting land titles embodying a plat containing a diagram of a tract of land, the diagram being divided into main areas and subdivisions thereof having identifying characters, in combination with a plat index having lines forming main vertical columns which equal in number the number of main areas of the plat, said main columns having intersecting horizontal and vertical lines forming subdivisional columns appropriately designated to receive entries of data pertaining to instruments affecting land situated in the plat, said subdivisional columns provided with headings arranged according to the different subdivisions of the diagram, said headings being composed of characters like the identifying characters on the subdivisions of the diagram, said characters for the subdivisional columns serving to denote what particular subdivisions of the plat are affected by the instruments.

3. A device for facilitating the entry and examination of instruments affecting land titles embodying a plat sheet containing a diagram of a tract of land, said diagram being divided into main areas and subdivisions thereof having identifying characters, in combination with a plat index having vertical lines forming main columns which equal in number the number of main areas of the plat, said main columns having intersecting horizontal and vertical lines forming subdivisional columns which are appropriately designated to receive entries of data pertaining to instruments affecting land situated in the plat, the main and subdivisional vertical columns being provided with headings composed of characters which are individual to the respective vertical columns and like the identifying characters for the main areas and subdivisions of the diagram.

In testimony whereof I have hereunto set my hand in presence of two subscribing witnesses.

AMBROSE W. ESTES.

Witnesses:
ELMER OWENS,
A. G. FLIPPIN.